(12) United States Patent
Husted

(10) Patent No.: US 8,739,427 B2
(45) Date of Patent: Jun. 3, 2014

(54) MANUAL THICKNESS MEASUREMENT GAGE

(76) Inventor: Ernie Husted, Anaheim, CA (US)

(*) Notice: Subject to any disclaimer, the term of this patent is extended or adjusted under 35 U.S.C. 154(b) by 310 days.

(21) Appl. No.: 13/237,511

(22) Filed: Sep. 20, 2011

(65) Prior Publication Data

US 2013/0067760 A1   Mar. 21, 2013

(51) Int. Cl.
*G01B 3/24* (2006.01)
*G01B 5/06* (2006.01)

(52) U.S. Cl.
USPC .................. 33/784; 33/794; 33/802

(58) Field of Classification Search
CPC ............ G01B 3/008; G01B 3/22; G01B 3/24; G01B 3/38; G01B 5/06; G01B 5/061; G01B 5/063; G01B 5/065; G01B 5/068
USPC .............. 33/783, 784, 794, 802, 804
See application file for complete search history.

(56) References Cited

U.S. PATENT DOCUMENTS

| | | | |
|---|---|---|---|
| 202,866 A | 4/1878 | Pratt | |
| 346,706 A | 8/1886 | Barnes | |
| 1,283,753 A * | 11/1918 | Hazeltine | 33/794 |
| 1,307,775 A * | 6/1919 | Hacker | 73/818 |
| 1,356,214 A * | 10/1920 | Metzger | 33/543 |
| 1,505,408 A * | 8/1924 | Morse | 33/794 |
| 1,531,357 A * | 3/1925 | Tautz | 33/794 |
| 1,879,559 A * | 9/1932 | Smart | 33/501.02 |
| 2,051,357 A | 8/1936 | Zenke | |
| 2,080,534 A | 5/1937 | Darlington | |
| 2,095,226 A * | 10/1937 | Bohn | 33/794 |
| 2,134,184 A * | 10/1938 | Guyer | 33/804 |
| 2,152,880 A | 4/1939 | Dowdy et al. | |
| 2,321,121 A * | 6/1943 | Basquin | 33/501.05 |
| 2,337,509 A * | 12/1943 | Todd | 33/543 |
| 2,734,275 A | 2/1956 | Ring et al. | |
| 3,208,148 A | 9/1965 | Welch | |
| 7,277,811 B1 | 10/2007 | Marsh et al. | |
| 7,285,793 B2 | 10/2007 | Husted | |

FOREIGN PATENT DOCUMENTS

| | | | | |
|---|---|---|---|---|
| CN | 102927883 A | * | 2/2013 | G01B 5/06 |
| SU | 1019212 A | * | 5/1983 | G01B 5/06 |
| WO | WO 2010125683 A1 | * | 11/2010 | G01B 5/06 |

* cited by examiner

*Primary Examiner* — R. A. Smith
(74) *Attorney, Agent, or Firm* — Patent Law & Venture Group; Gene Scott

(57) ABSTRACT

A manual gauge measures a specimen's thickness by pressing surface contactors against its opposing surfaces. A rigid C-frame has upper and lower jaws providing a means for engaging a specimen and for gauging its thickness using a linear probe that is caused to move linearly between the jaws by a handle assembly. The handle assembly is joined with the C-frame at a point that is co-linear with a force vector of the probe against a workpiece resting on one of the jaws. The force of the probe is transmitted through the specimen to the jaw. The handle leverages from this jaw so that there is no force applied between the jaws thereby avoiding error due to the varying hand pressure by the operator and the resultant strain in the C-frame during measurements.

6 Claims, 6 Drawing Sheets

MANUAL THICKNESS MEASUREMENT GAGE

BACKGROUND

The present disclosure relates to hand gauges for measuring material thickness and more particularly to such a hand operated gauge capable of more precise measurements and particularly a hand operated thickness measuring gauge capable of avoiding error due to the differences in applied hand pressure of different operators.

Contact measuring tools are widely used to measure the thickness of flat materials by utilizing a linear gauge or the like. When measurements involve simultaneously contacting opposing sides of material (specimen) and determining the thickness thereof, conventional tools are used such as are described in US patents: U.S. Pat. Nos. 202,866; 346,706; 2,051,357; 2,080,534; 2,152,880; 2,734,275; and 3,208,148. In common use are gauges that use a C-shaped jaw having a fixed jaw opening and which have a fixed handle mounted as a part of the jaw, and a pivoting handle also mounted to the jaw allowing the two handles to be squeezed toward each other thereby drawing a fixed and a movable surface contactors toward each other. The stationary contactor is secured to one side of the jaw, while the movable contactor is mounted on a probe of a measurement gauge which is mounted on the opposing side of the jaw, with the two contactors facing each other. The pivoting handle is engaged with the probe so that by drawing the handles toward each other, the two contactors may be brought into mutual contact for zeroing the measurement gauge, and also into contact with opposing sides of the material (specimen) placed between the contacts so as to measure its thickness as indicated by the measurement gauge. Of course the measurement gauge may be read directly, or may be fitted for transmitting a measurement to a distant recorder. Such a hand tool provides significant convenience when thickness measurements must be made directly on a large work piece as for instance in an assembly area.

The accuracy of measurement is influenced, for example, by the pressure applied by the operator, the rigidity of the tool in general, by the flatness and parallelism of the opposing contacts, and by any warp in the specimen. The measuring accuracy is affected as well by distortion of the specimen caused by the contacts. The advantages of a hand tool, include portability, measurement speed, and adaptability to the measurement situation, i.e., the ability to place the tool into various attitudes and positions to accommodate the location and position of the specimen. Clearly, the use of such a tool has disadvantages as well. For example accuracy may suffer due to changes in ambient temperature within a factory site over the course of a work shift. Dust particles may degrade both accuracy and precision. The tool may suffer contact or gauge misalignment due to rough handling. Of course by proper operator training and ambient conditions control, these problems can be minimized. Error may also be caused by variations in the hand force applied to the handles during a measurement. Such force variations can change the linear dimension of the jaw's opening. For instance, a common micrometer holds a measurement gauge at one jaw of the tool. A workpiece is inserted between its jaws and the gauge probe is moved in contact with the workpiece. The force of the probe exerts a force against the workpiece and also against the lower jaw. This force tends to cause strain between the jaws which introduces measurement error. The presently described tool avoids this source of error as will be described thereby providing improved measurement accuracy and precision.

SUMMARY

A hand-operated gauge measures a specimen's thickness by pressing contactors against its opposing surfaces. A C-frame of the tool provides opposing jaws defining an open throat into which the specimen is inserted and rested against a fixed contactor mounted on one of the opposing jaws. A handle assembly provides a fixed handle and a hinged handle. The handle assembly is engaged solely with a lower one of the jaw of the C-frame. The hinged handle pivots to press a movable contactor on a measurement gauge probe against an opposing surface of the specimen. The pressure applied to the specimen does not exert any force on the C-frame or on the jaws. Since no force is exerted between the jaw's their spacing is constant no matter how lightly or forcefully the movable contactor is pressed against the specimen. Therefore, measurement error due to such influences is avoided.

In one aspect of the present apparatus, a pair of handles are operated manually to provide pressure to opposing contactors to measure the thickness of a specimen held between the contactors.

In another aspect of the apparatus, a spring is used to press one contactor toward the other thereby eliminating the variability of manual pressure.

In another aspect of the apparatus, the pressure applied to the movable contactor is isolated from the rigid jaw so as to eliminate measurement error that otherwise might occur due to small changes in the size of the jaw throat due to strain in the C-frame.

The details of one or more embodiments of these concepts are set forth in the accompanying drawings and the description below. Other features, objects, and advantages of these concepts will be apparent from the description and drawings, and from the claims.

DESCRIPTION OF DRAWINGS

FIGS. 1-3 are example side elevational concept views of a first embodiment of the presently disclosed tool wherein a lower handle is pivoted to open a probe by spring pressure while an upper handle is fixed; wherein FIG. 1 shows the lower handle at a nominal rest position, FIG. 2 shows the lower handle pressed manually for zeroing the tool, and FIG. 3 shows the lower handle manually force upwardly to clamp the workpiece by manual pressure for taking a thickness measurement.

FIGS. 4-6 are example side elevational concept views of a second embodiment of the presently disclosed tool wherein an upper handle is pivoted for applying spring pressure to a workpiece while a lower handle is fixed; wherein FIG. 4 shows the upper handle at a nominal rest position, FIG. 5 shows the upper handle pressed manually downward for placement of a workpiece into a jaw of the tool, and FIG. 6 shows the upper handle released to clamp the workpiece by spring pressure for taking a thickness measurement.

Like reference symbols in the drawings indicate like elements.

DETAILED DESCRIPTION

Figure 3:
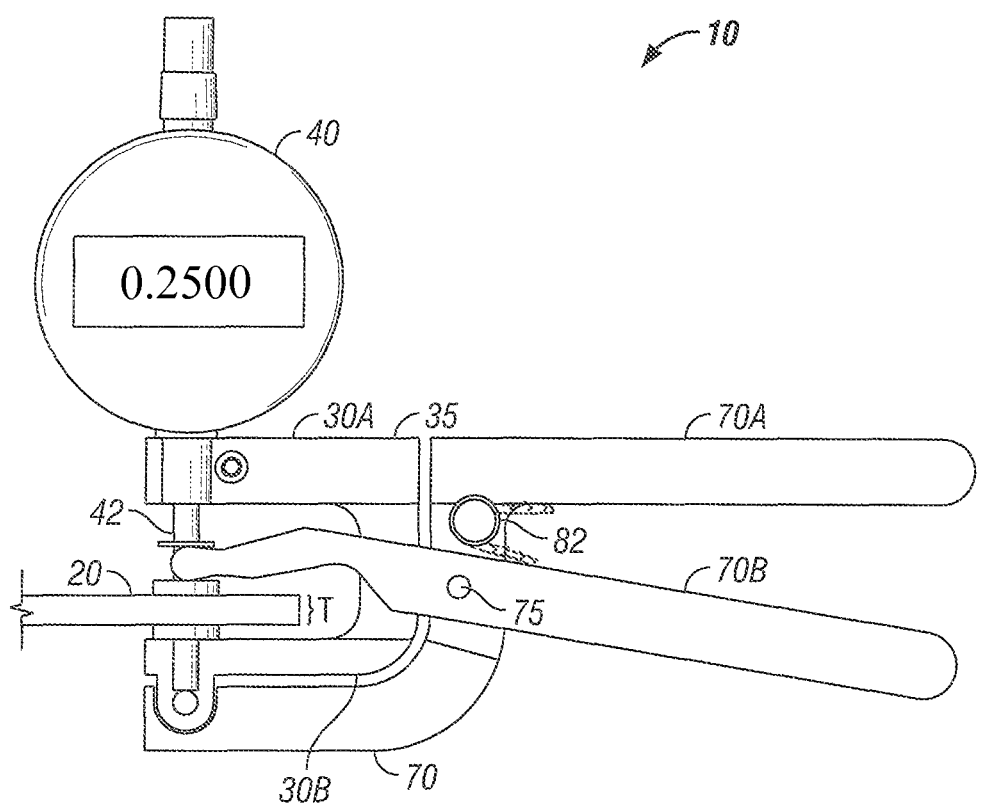
Figure 5:
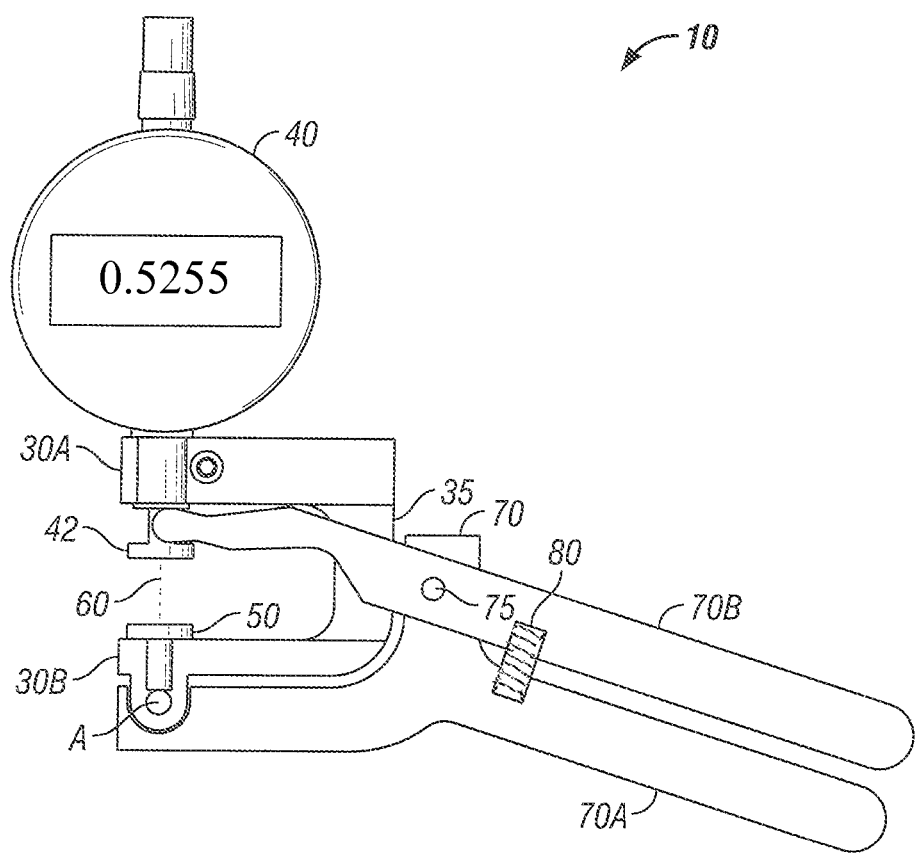

The figures illustrate a manual thickness measuring tool 10, the subject of this disclosure. The tool 10 is used for measuring the thickness of a sheet material workpiece 20, as shown in FIGS. 3 and 5. As shown, a top 30A and a bottom 30B jaws form a rigid C-frame 35 defining a space 30 between the jaws. A measurement gauge 40 is supported on the top jaw, and a workpiece rest 50 is supported on the bottom jaw 30B. A measurement probe 42 is operationally engaged with the measurement gauge 40 wherein linear extension of the probe 42 along a line of travel 60 in the space 30 derives linear measurement by the measurement gauge 40. The probe 42 is joined with gauge 40 through a clearance hole 32 in the top jaw 30A. The relationship between gauge 40 and probe 42 is not described here as this device is very well known in the field of calibration and measurement metrology. A handle assembly 70 is engaged with the bottom jaw 30B and this engagement is located solely at position "A" which is collinear with the line of travel 60 of the probe 42. The handle assembly 70 may have a fixed handle 70A and a hinged handle 70B wherein the hinged handle 70B is engaged with the probe 42 so that rotation of the hinged handle 70B about hinge pin 75 moves the probe 42 along the line of travel 60. As shown in FIGS. 3 and 5, a thickness "T" of the workpiece 20 is determined by moving the probe 42, using hinged handle 70B, so that probe 42 contacts one surface of the workpiece 20 while an opposing surface of the workpiece 20 lies against the workpiece rest 50.

The measurement gauge 40 may be a dial gauge, a digital gauge, or any similar gauging device as known in the field of the present apparatus and may be capable of direct reading or wireless transmission of its measurements to a remote receiver.

The probe 42 and the workpiece rest 50 may have mutually facing planar surfaces or gimbaled platens, wherein with these surfaces contacting the opposing sides of workpiece 20 the thickness measurement "T" of the portion of the workpiece 20 that is between the planar surfaces may be determined.

Figure 1:
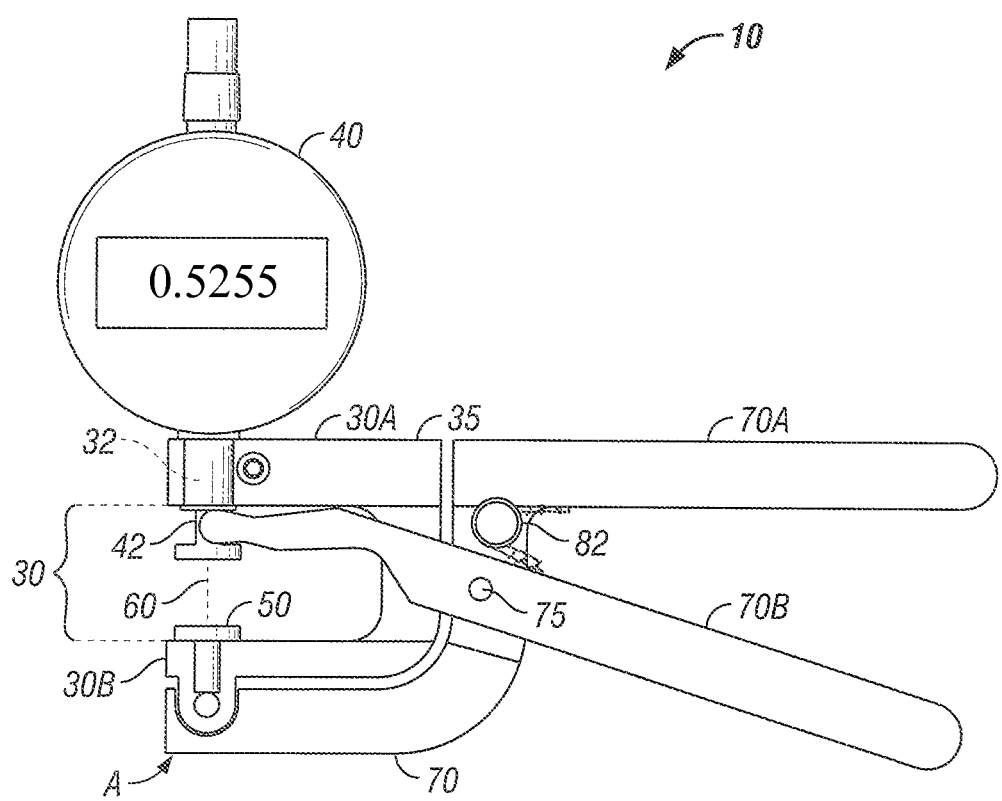
Figure 2:
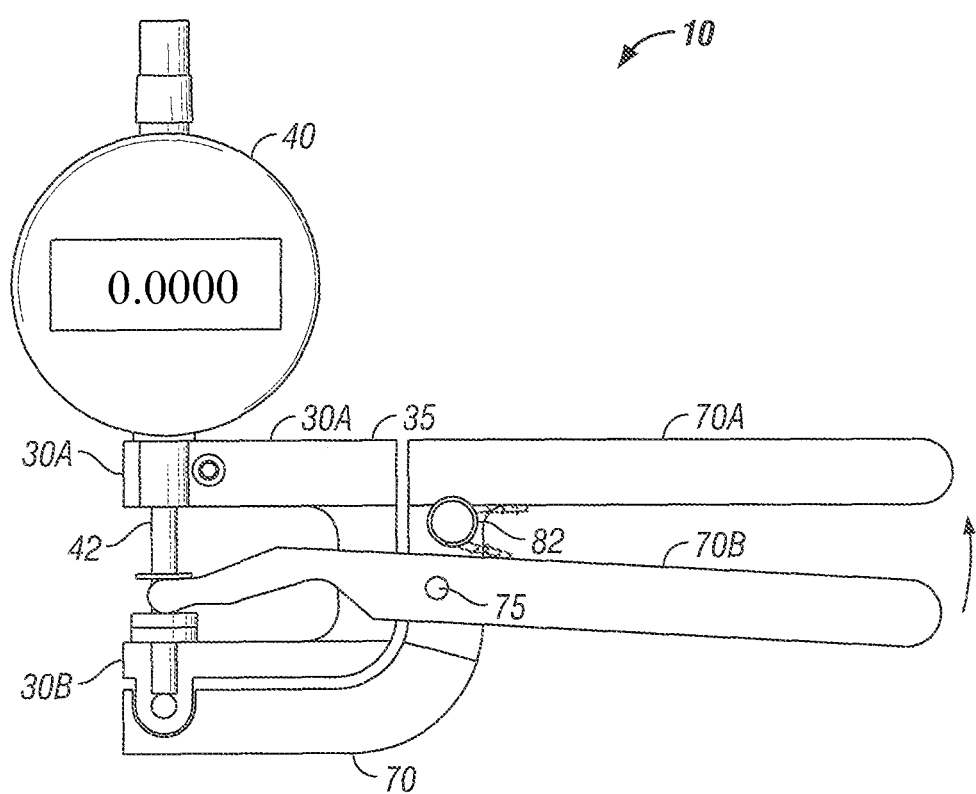

The handle assembly 70 does not engage the C-shaped frame 35 except at point "A" as shown in the figures and this is emphasized by showing a space between the handle assembly 70 and the C-shaped frame although such a space is not required for full operation of the apparatus. The result is that pressure of the probe 42 on the workpiece 20 is transferred through the workpiece 20 to the workpiece rest 50 and therefore to the bottom jaw 30B and this clearly has no effect on the dimension of space 30. No matter how much force is applied to the workpiece by hinged handle 70B there is no strain produced within the C-frame 35.

in the embodiment shown in FIGS. 1-3, the tool 10 handle 70B is normally held in the position shown in FIG, 1 by spring 82. Hand pressure is applied to handle 70B to manually move probe 42 down to the position shown in FIG. 2 for zeroing the instrument. Pressure is released to allow probe 42 to move upward for insertion of workpiece 20 between probe 42 and workpiece rest 50 as shown in FIG. 3, and then the handles 70A and 70B are squeezed together to apply a manual force onto the workpiece 20 by probe 42.

Figure 4:
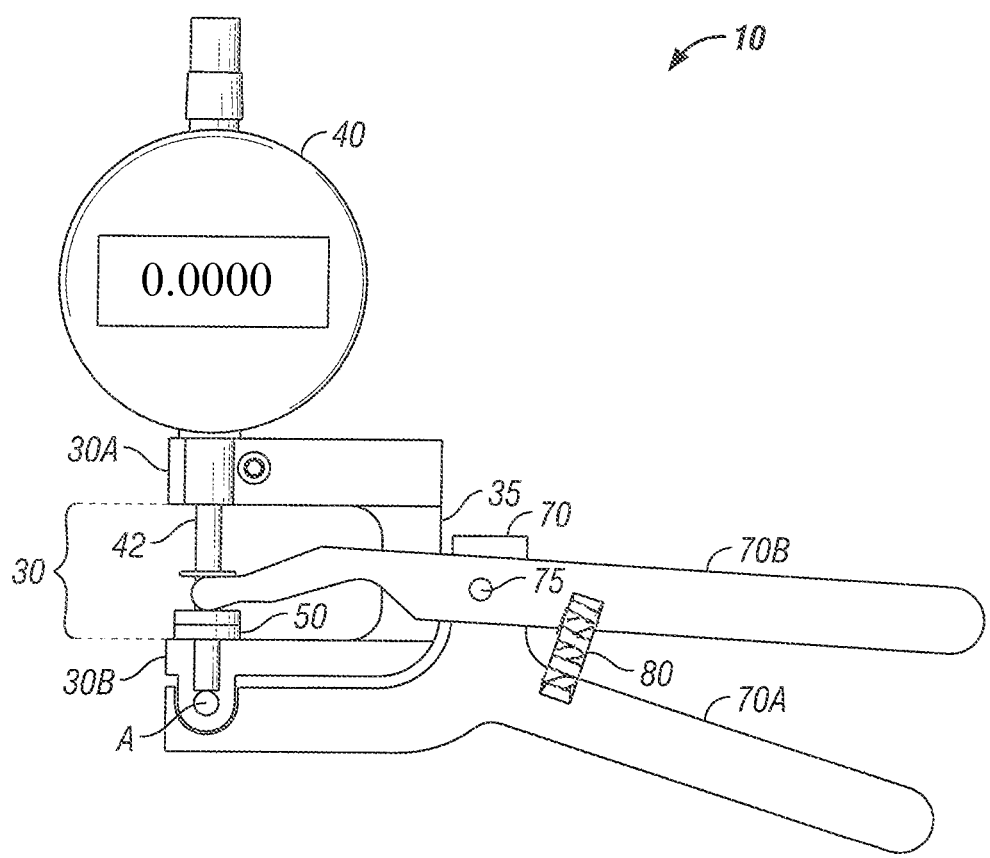
Figure 6:
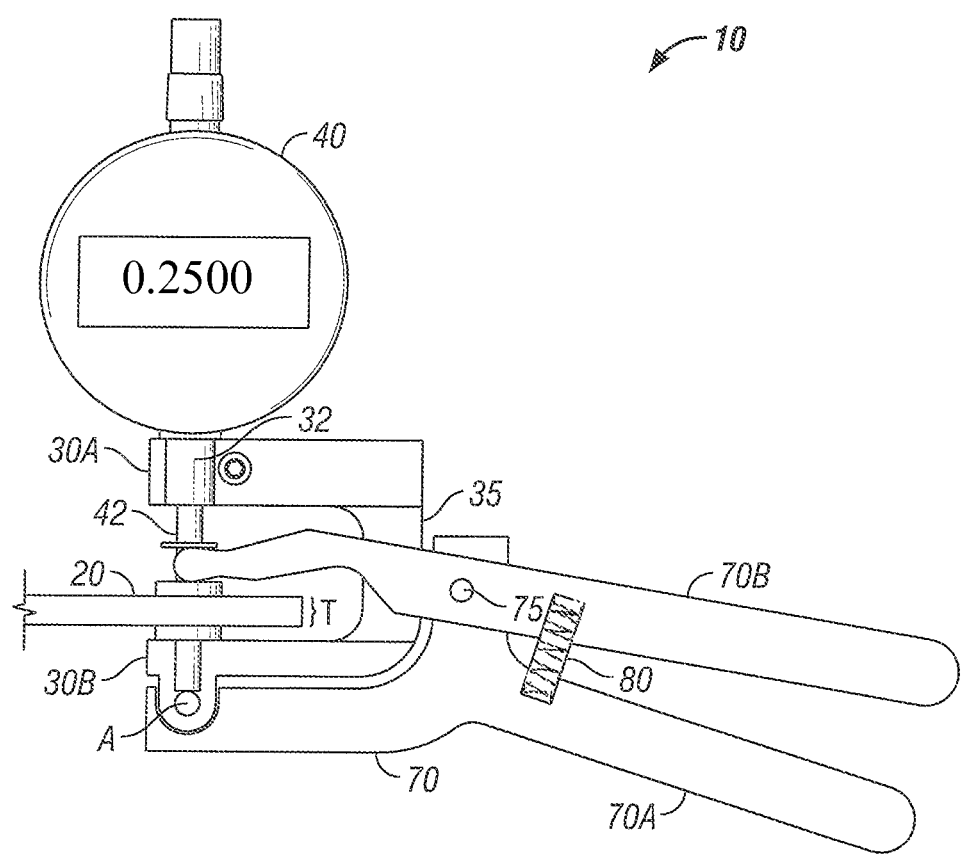

In the embodiment shown in FIGS. 4-6, the tool 10 expansion spring 80 is used instead of spring 82. In FIG. 4, spring 80 forces the handles 70A, 70B apart forcing probe 42 against workpiece rest 50. In FIG. 5 manual pressure is applied to handle 70B thereby raising probe 42 for insertion of workpiece 20. When handle 70B is released, probe 42 moves against workpiece 20 as shown in FIG. 6.

The advantage of the above described version of tool 10 shown in FIGS. 1-3 is that hand pressure may be applied taking the softness or hardness of the substrate 20 into account so that, for instance, damage to delicate substrates may be avoided. The advantage of the version of tool 10 in FIGS. 4-6 is that the force applied to workpiece 20 is a constant which eliminates the problem of different hand pressure being applied to the workpiece 20 by different workers.

Embodiments of the presently described tool have been described. Nevertheless, it will be understood that various modifications may be made without departing from the spirit and scope of this disclosure. Accordingly, other embodiments are within the scope of the following claims.

What is claimed is:

1. A manual tool for measuring a thickness of a workpiece, the tool comprising:
   a C-frame having a top jaw and a bottom jaw with a fixed space between the jaws;
   a measurement gauge supported by the top jaw;
   a workpiece rest supported by the bottom jaw;
   a probe engaged with the measurement gauge wherein linear extension of the probe along a line of travel in the fixed space derives linear measurement by the measurement gauge;
   a work handle assembly engaged with the bottom jaw solely at a position collinear with the line of travel of the probe, the work handle assembly having a fixed handle and a hinged handle, the hinged handle engaged with the probe wherein rotation of the hinged handle moves the probe along the line of travel;
   wherein, a thickness of the workpiece is determined by moving the probe against one surface of the workpiece while an opposing surface of the workpiece lies against the workpiece rest.

2. The tool of claim 1 wherein the measurement gauge is one of a dial gauge, and a digital gauge.

3. The tool of claim 1 wherein the probe and the workpiece rest have mutually facing surfaces, said surfaces, when in contact with the workpiece, enable a thickness measurement of the workpiece.

4. The tool of claim 1 wherein movement of the handles toward each other moves the probe toward the workpiece for applying pressure to the workpiece.

5. The tool of claim 4 wherein movement of the handles away from each other moves the probe away from the workpiece for releasing pressure from the workpiece.

6. The tool of claim 1 further comprising a a spring fitted between the handles wherein movement of the handles toward each other compresses the spring and movement of the handles by spring expansion moves the handles away from each other.

* * * * *